Jan. 31, 1956 E. M. STAPLES 2,733,299
SELECTOR SWITCH CIRCUIT
Filed Aug. 19, 1953
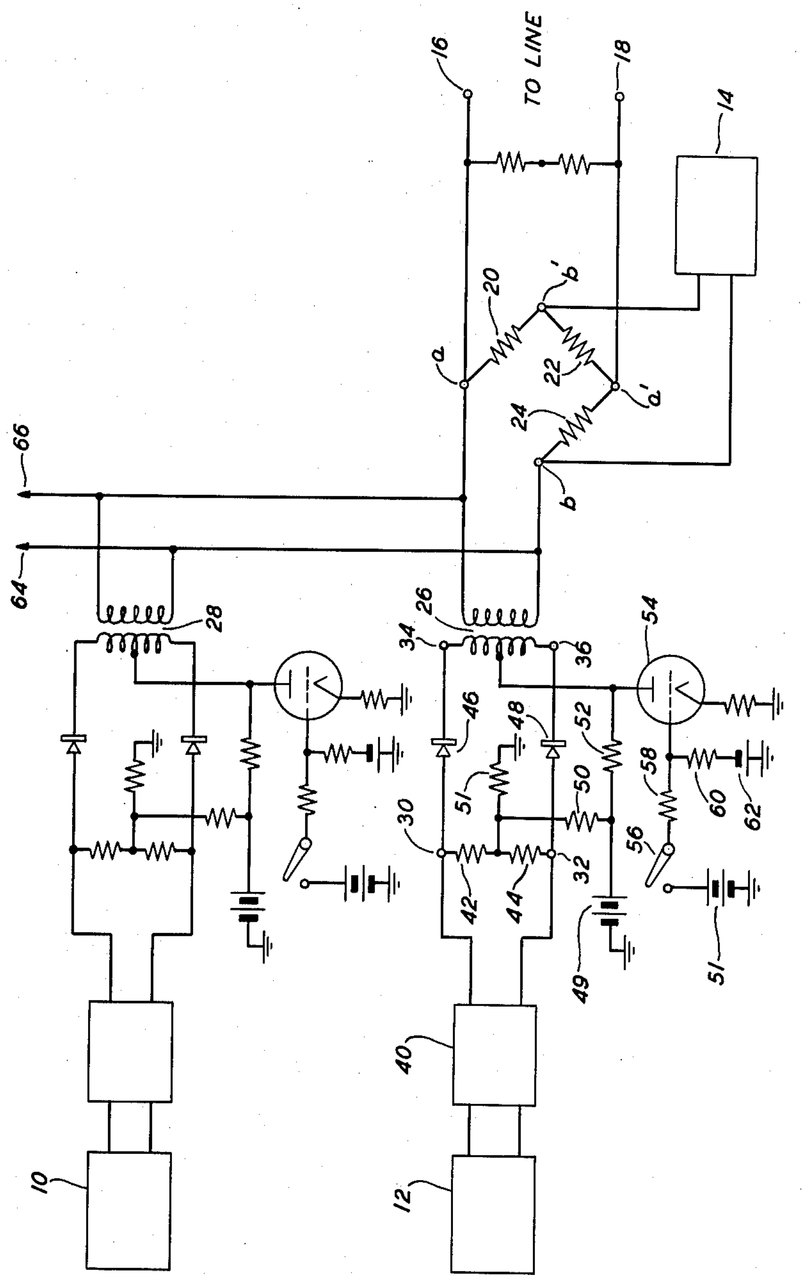
INVENTOR
E. M. STAPLES
BY [signature]
ATTORNEY United States Patent Office 2,733,299

Patented Jan. 31, 1956

2,733,299

SELECTOR SWITCH CIRCUIT

Elliot M. Staples, Hohokus, N. J., assignor to Bell Telephone Laboratories, Incorporated, New York, N. Y., a corporation of New York Application August 19, 1953, Serial No. 375,251

5 Claims. (Cl. 179—84)

This invention relates to selective control circuits and more particularly to control circuits for use in multifrequency signaling systems.

It has become common in many communication systems to employ voice frequency tones transmitted over the communication facility for the purpose of controlling switching circuits and the like at locations remote from the control point. In one arrangement of this kind, voice frequency tones are applied selectively to a telephone line to control the operation of switching equipment at a remotely located telephone exchange. Similar voice frequency signaling systems find application in the control of automatic switching systems employed for the protection of radio relay circuits against service interruptions caused by fading in the transmission path or by equipment failures. A system of this latter kind is disclosed in the copending application of J. B. Maggio, Serial No. 309,447, filed September 13, 1952.

In many applications of multifrequency signaling it has been found desirable to operate the system in such a way that a signaling tone is present on the line at all times. Thus it is common to apply a tone of a frequency different from the signaling frequencies to the line whenever none of the signaling frequencies is present. This additional tone, often referred to as a guard tone, may then be used to render the receiving equipment insensitive to noise voltages and to any spurious signals reaching the receiving equipment. When such guard tone signals are employed it is desirable to provide simple and reliable apparatus at the transmitting point arranged to permit alternative application of any of a number of signaling tones or the guard tone to the line. Control circuits employed for this purpose should operate at extremely high speeds and should not require the simultaneous operation of a plurality of switching elements.

It is the object of the present invention to provide simple and reliable circuits for the selective application of any of a plurality of signaling tones or a guard tone to a transmission facility.

In accordance with the invention, therefore, there is provided a selective control circuit comprising at least first and second sources of signals. The output of one signal source is applied to the input of a switching circuit which is arranged to operate in response to an external control voltage to interconnect its input circuit and an output circuit. The output circuit of the switch is connected as one arm of a network which may comprise a hybrid network or a four-arm bridge the remaining arms of which are proportioned for balance only when the switch is operated to complete the input-output circuit connection. The second signal source is connected across one branch of this network and the transmission facility to which the signals from the sources are to be selectively applied is connected across a conjugate branch of the network.

The above and other features of the invention will be described in detail in connection with the drawing in which the single figure is a schematic diagram of a selective circuit according to the invention as arranged for the controlled application of either of two signaling tones or a guard tone alternatively to the line.

As shown in the drawing there are provided two sources of signaling tone 10 and 12. These sources may comprise conventional oscillators operating at frequencies in the frequency range employed for signaling over the transmission facility and sufficiently different to permit discrimination therebetween by the controlled apparatus. A third source 14 comprising an oscillator operating at still another frequency within the frequency range supplies a guard tone. As has been pointed out above, it is desired for signaling purposes to apply the outputs of one or both of the sources 10 and 12 to the line for the purpose of signaling thereover and also to apply the third frequency or guard tone signal to the line whenever neither of the signaling tones are present.

As shown in the drawing, the voice frequency line or other transmission facility is connected through terminals 16 and 18 across one diagonal *aa'* of a typical balanced network comprising a four-arm bridge the arms of which consist of impedances 20, 22 and 24 and the impedance as seen across the paralleled secondary windings of transformers 26 and 28, connected between points *a* and *b* of the bridge. These transformers permit application of the outputs of the tone signal sources 10 and 12 to the bridge under selected conditions.

For the purpose of controlling the application of the outputs of oscillators 10 and 12 to the bridge and thence ultimately to the transmission facility, switches or keying circuits are employed. These circuits, one of which is associated with each of the signal oscillators, may be identical and a description of that associated with oscillator 12 will suffice for a clear understanding of the invention.

Briefly, the switch or keying circuit comprises means for connecting an input signal appearing between points 30 and 32 to an output circuit comprising the center-tapped primary winding of transformer 26 connected between points 34 and 36. Conveniently, the input signal from oscillator 12 is applied to an isolating pad 40 the output of which appears across resistors 42 and 44 connected in series between points 30 and 32. Point 30 is connected to point 34 through varistor or rectifier 46 poled in the low impedance direction and point 32 is connected to point 36 through a similarly poled varistor or rectifier 48.

As is well understood in the art, varistors 46 and 48 may be caused to present a low impedance to the passage of current from left to right in the drawing or, alternatively, a high impedance to the passage of such current by appropriate adjustment of the bias voltages applied thereto. Thus, if the voltage applied to the center-tap of transformer 26 and thus to the right hand terminals of varistors 46 and 48 is less than that applied to the left hand terminals, the varistors present a low impedance to the connected circuits and current flows therethrough. If, on the other hand, the applied voltages are reversed, varistors 46 and 48 represent high impedances to the connected circuits and the input terminals 30 and 32 are essentially isolated from output terminals 34 and 36. The above described circuit may therefore be employed to control the passage of oscillations from source 12 to the output circuit between terminals 34 and 36 by appropriate control of the voltages applied to the two varistors. For this purpose the junction of resistors 42 and 44 is connected through a resistor 50 to a source of positive potential indicated as comprising a battery 49 the negative terminal of which is grounded. Resistor 50, together with resistor 51 forms a voltage divider which determines the potential applied to the junction. Similarly, the center-tap of the primary winding of transformer 26 is connected through a resistor 52 to the same source of potential. Resistors 50, 51 and 52 are so proportioned that the potential applied to the left hand terminals of varistors 46 and 48 is negative with respect to that applied to the right hand terminals thereof. Under these circumstances, as pointed out above, the varistors are essentially non-conducting and represent high impedances.

A vacuum tube 54 which may conveniently comprise a conventional triode tube is connected in circuit in such a way as to control the potential applied to the right hand terminals of the varistors in accordance with an external control voltage. To this end the discharge path of the tube may be connected between the center tap of the primary winding of transformer 26 and the low potential terminal of battery 49. Thus, when tube 54 draws current from the battery this current flows through resistor 52 lowering the positive potential applied to the right hand terminals of the varistors. Control of the space current in tube 54 is accomplished by means of an on-off voltage from battery 51 which is connected through a resistor 58 to the control grid of the tube under the control of a switch 56 or a control relay. The grid return comprises a resistor 60 in series with a battery 62 which is so poled as normally to apply a cutoff bias to the tube.

From the above it will be seen that the application of the outputs of oscillators 10 and 12 to the bridge may be controlled by external signals applied to the control grids of the associated keying circuits. Although two keying circuits have been disclosed it will be obvious that additional keying circuits and associated oscillators as required by the signaling system to be employed may be added and connected to the common leads 64 and 66 in the same manner as the previously described keying outputs are connected thereto. It will be recognized that the arm of the bridge circuit extending between points *a* and *b* comprises the secondary windings of transformers 26 and 28 in parallel and that as additional keying circuits are added to leads 64 and 66, additional windings will be connected in parallel between points *a* and *b*.

Each of the keying circuits when viewed from points *a* and *b* represents either a high impedance when the varistors thereof are in the non-conducting state or a relatively low impedance when the varistors are in the conducting state. Thus, the impedance between points *a* and *b* looking into the keying circuits is determined by the conditions of operation of the several keying circuits. If neither keying circuit is operated to interconnect its input and output, a high impedance is seen between points *a* and *b*. Although all of the keying circuit output connections are in parallel, the impedances thereof in the non-conducting state are high enough so that the number of keying circuits connected between points *a* and *b* does not have any practical effect upon the impedance seen from points *a* and *b*. Each of the keying circuits approximates an open circuit with these conditions. If, however, one keying circuit is in the conducting condition the low impedance, looking back into the keying circuit as seen from points *a* and *b*, is sufficiently different from the parallel high impedance when all of the keying circuits are non-conductive to effect a significant change in the total impedance between points *a* and *b*.

In view of the above impedances 20, 22 and 24 constituting the remaining three arms of the bridge are proportioned in such a way as to balance the bridge when the predetermined number of the keying circuits is in the conducting state and thus is presenting a low impedance as seen between points *a* and *b*. It will be recognized then that whenever the predetermined number of the keying circuits is energized to connect its associated oscillator to the bridge, the bridge will be balanced and that whenever no keying circuit is energized the bridge will be unbalanced. By way of example the circuit can be arranged for balance whenever a single keying circuit is energized.

Alternatively the circuit may be arranged for balance whenever fewer or more than a particular number of keying circuits are energized to permit the use of multiple signaling tones on the line.

Under these conditions the application of the output of guard tone oscillator 14 to the line is controlled by the same externally supplied signals as the application of signaling tones to the bridge, but in the opposite sense. Thus, in the circuit as arranged for balance when one keyer is energized whenever any keying circuit is energized to connect its associated signaling tone source between points *a* and *b*, the four-arm bridge is balanced and the output of oscillator 14 applied to the bridge across diagonal *bb'* cannot reach the line connected across the other diagonal of the bridge. On the other hand, the output of the energized keying circuit comprising the desired signaling tone is applied across a single arm of the bridge and therefore appears across the output diagonal. Conversely, whenever none of the keying circuits is energized the bridge will become unbalanced by virtue of the high impedance connected between the points *a* and *b* permitting the output of guard tone oscillator 14 to reach output terminals 16 and 18 for application to the line or other transmission facility.

The circuit therefore operates in response to a single control impulse to substitute a signaling tone for the guard tone normally applied to the line and operates in such a way that a tone is applied to the line at all times.

What is claimed is:

1. A selective circuit for applying either a first tone signal or any of a plurality of other tone signals to a transmission facility comprising a source of said first tone signals, a plurality of sources of said other tone signals, a plurality of switches for controlling respective signal paths between said last-mentioned sources and said facility, each of said plurality of sources having a relatively high output impedance when its signal path to said facility is interrupted by its associated switch and a relatively low impedance at other times, a four-arm bridge including in one arm the paralleled output circuit of said switches and proportioned for balance only when the output impedance of a predetermined number of said other sources are at their relatively low values, means for connecting said one signal source across one diagonal of said bridge and means for connecting the other diagonal of said bridge to said transmission facility.

2. A selective circuit comprising a first signal source and a plurality of other signal sources, keyers each having an input circuit and an output circuit and responsive to external controls effectively to interconnect said respective input and output circuits, each of said other signal sources having one of said keyers associated therewith by way of its input circuit, a four-arm bridge including the paralleled output circuits of said keyers in one arm, the other arms of said bridge being proportioned to balance said bridge only when a predetermined number of said keyers is operated to complete its input-output circuit connection, means for connecting said first signal source across one diagonal of said bridge, and an output for the selected signal connected across the other diagonal of said bridge.

3. In a selective circuit, a four-arm bridge, a first signal source, means for connecting the output thereof across one diagonal of said bridge, an output circuit connected across the other diagonal of said bridge, a plurality of other signal sources, means for selectively connecting the outputs of said sources across one arm of said bridge, and reducing the impedance of said arm to a predetermined range when at least a predetermined number of such connections are made, the remaining arms of said bridge being proportioned for substantial balance thereof only when the impedance across said arm is within said range.

4. A selective circuit comprising a four-arm bridge, a first signal source connected across one diagonal of the bridge, a transmission facility connected across the other diagonal of the bridge, at least one other signal source including a signal generator and a transformer having a primary coupled to the generator and a secondary connected in an arm of the bridge, and means for keying said other source of signal on and off and in so doing altering the impedance across the primary of said transformer, the coupling between said primary and secondary being close enough for impedance changes across the primary to be reflected into the output of the secondary, said bridge being proportioned for balance only for the secondary's output impedance condition which obtains when said source is in a predetermined one of its on and off conditions.

5. A selective circuit comprising a four-arm bridge, a first signal source connected across one diagonal of the bridge, a transmission facility connected across the other diagonal, at least one other signal source and for each thereof a respective transformer having a primary and a secondary, and a keying means including a network connecting the source to the primary, the means being adapted to enable and disable a signal transmission path over the network from said other source to said primary and in so doing to change the impedance of the network across the primary from one to the other of two predetermined values, said secondary being connected in an arm of the bridge, the coupling between said primary and secondary being close enough for such changes in impedance across the primary to be substantially reflected into the secondary, said bridge being proportioned for balance only for the secondary's output impedance condition which obtains when the impedance of said network across the primary has a predetermined one of said two values.

References Cited in the file of this patent

UNITED STATES PATENTS 2,069,932 Wintringham ------------- Feb. 9, 1937